Feb. 17, 1970     L. C. JENKINS     3,496,565

APPARATUS FOR MEASURING ANGLES

Filed Oct. 23, 1968     3 Sheets-Sheet 1

INVENTOR
LAWRENCE C. JENKINS
BY
Mason, Mason & Albright
ATTORNEYS

Feb. 17, 1970     L. C. JENKINS     3,496,565

APPARATUS FOR MEASURING ANGLES

Filed Oct. 23, 1968     3 Sheets-Sheet 2

INVENTOR
LAWRENCE C. JENKINS
BY
Mason, Mason & Albright
ATTORNEYS

United States Patent Office 3,496,565
Patented Feb. 17, 1970

3,496,565
APPARATUS FOR MEASURING ANGLES
Lawrence C. Jenkins, Twyning Green, near Tewkesbury, England, assignor to Racal Communications Limited, Bracknell, England, a British company
Filed Oct. 23, 1968, Ser. No. 769,950
Claims priority, application Great Britain, May 14, 1968, 22,759/68
Int. Cl. G01s 5/04
U.S. Cl. 343—119          10 Claims

ABSTRACT OF THE DISCLOSURE

Apparatus is disclosed for use in direction finding, and comprises two channels respectively receiving signals proportional to the sine and cosine of a desired bearing angle. Each channel includes an amplifier, and the gain of one amplifier is automatically adjusted to bring the ratio between the signals in the two channels to unit. Under this condition, the gain of the adjusted amplifier is proportional to the tangent of cotangent of the desired angle according as to which of the sine and cosine signals was the greater initially. Since the tangent or cotangent of the angle. Each channel includes an amplifier, and the gain of tained.

BRIEF SUMMARY OF THE INVENTION

The invention relates to apparatus for measuring angles, and, in particular, to apparatus for measuring bearings in a direction finding system.

According to the invention, there is provided apparatus for measuring the bearing angle of a received electromagnetic signal, comprising means responsive to the electromagnetic signal to produce first and second electrical signals respectively proportional to the sine and cosine of the bearing angle, comparing means operative to measure the ratio between the two electrical signals, modifying means operative to modifying the value of at least one of the electric signals by such factor as makes the ratio unity, whereby the said factor is proportional to the tangent of the required bearing angle.

According to the invention, there is also provided apparatus responsive to first and second electric signals respectively proportional to the sine and cosine of the same angle and operative to produce an output proprotional to the said angle, comprising first generating means operative to produce a substantially linearly increasing control signal, second generating means responsive to the control signal and operative to produce a tangent signal which is substantially proportional to the tangent of the value of the control signal over at least a predetermined range, modifying means responsive to the tangent signal and operative to modify the value of at least one of the electrical signals by a factor which is proportional to the tangent signal and tends to bring the ratio between the two electrical signals to unity, and comparing means operative to measure the said ratio after modification and arranged to arrest the increase of the said control signal when the ratio is unity, whereby the value of the arrested control signal is characteristic of the said angle.

DRAWINGS

Figure 1:
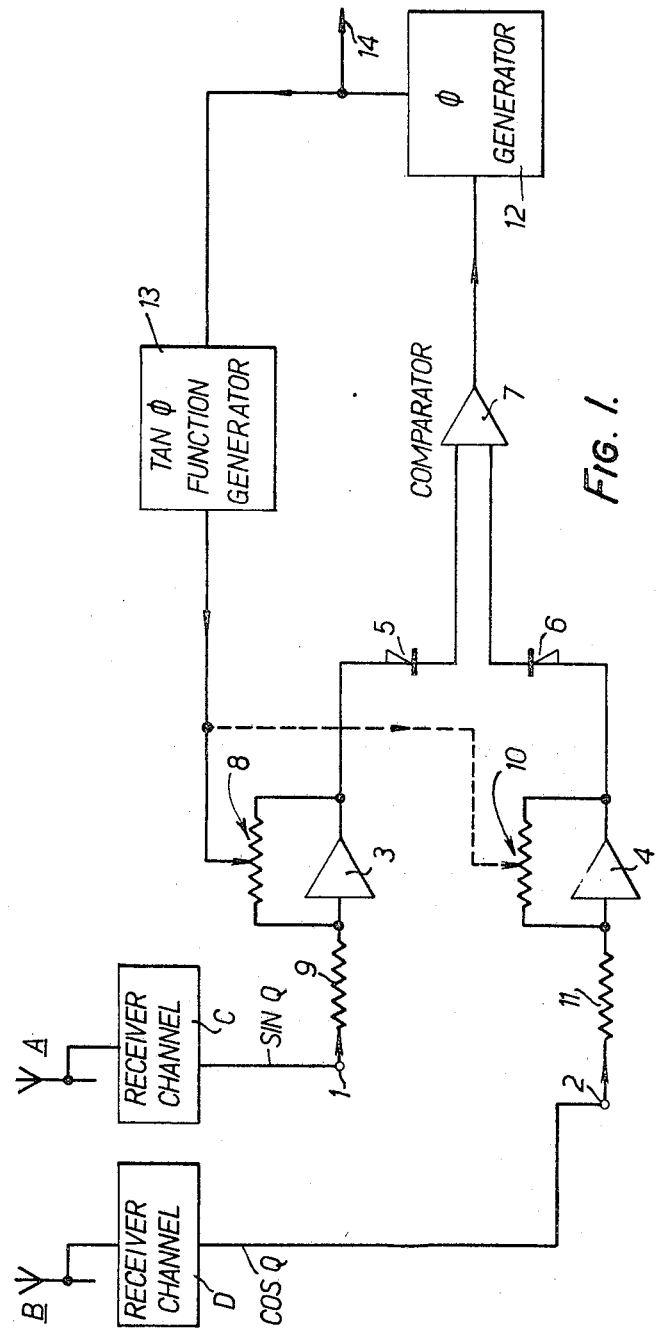
Figure 2:
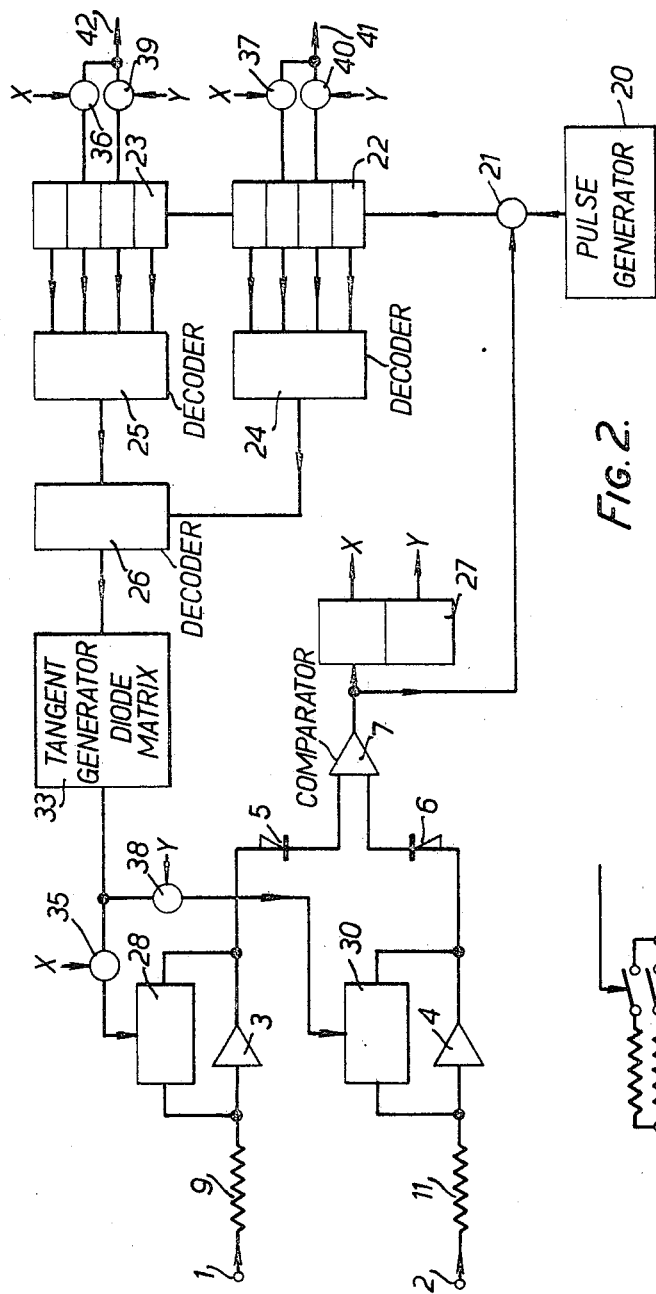
Figure 3:
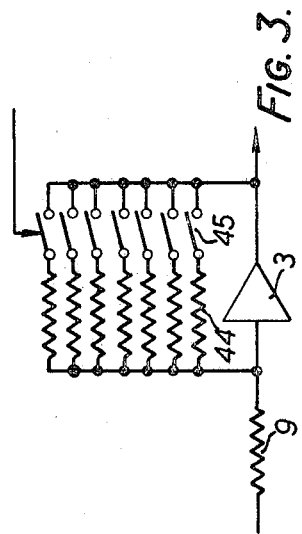
Figure 4:
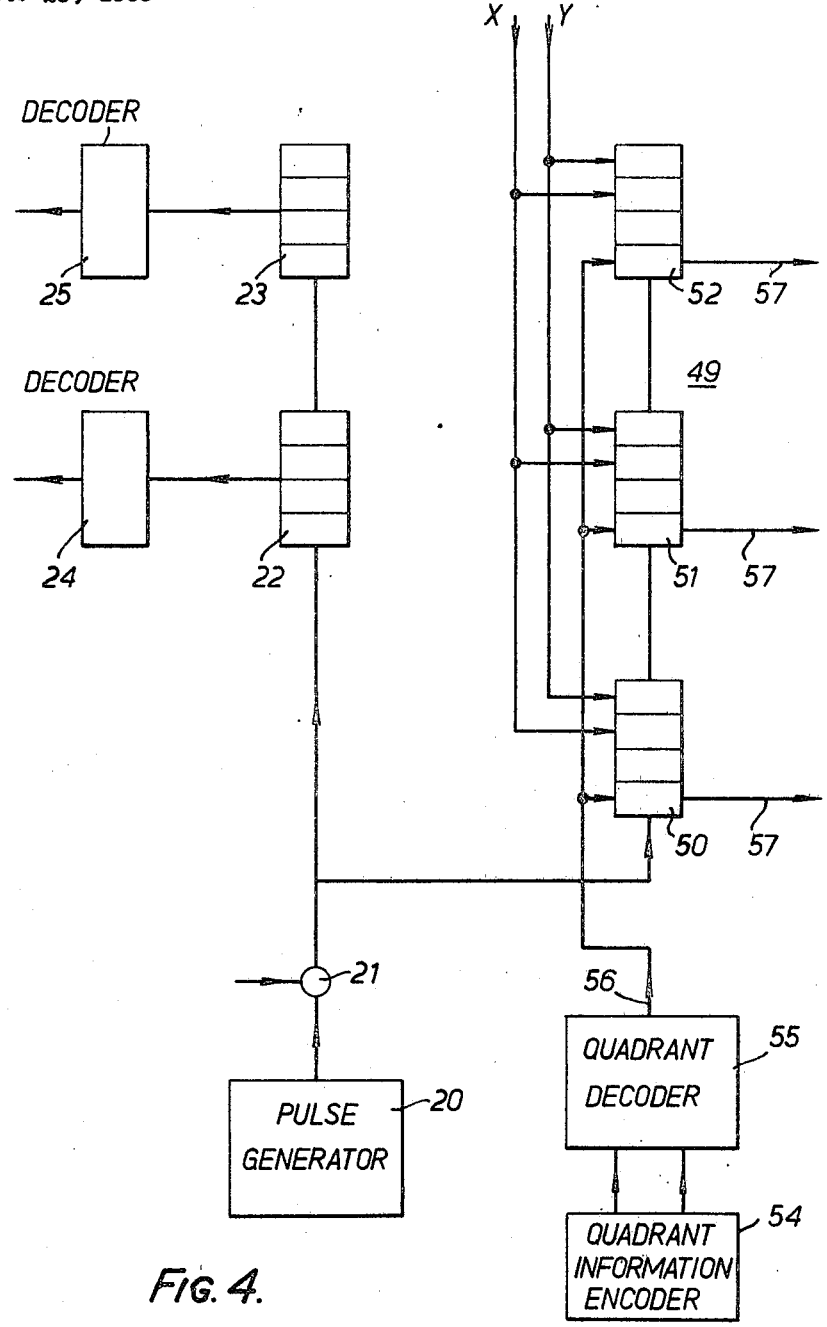

Direction finding apparatus embodying the invention will now be described, by way of example only, with reference to the accompanying drawings in which:
FIGURE 1 is a simplified schematic circuit diagram of part of the apparatus;
FIGURE 2 is ablock circuit digram of part of the apparatus corresponding to that shown in FIGURE 1;
FIGURE 3 is a circuit diagram of part of the apparatus shown in FIGURE 2; and
FIGURE 4 is a block circuit diagram illustrating a modification of the apparatus.

DETAILED DESCRIPTION

The apparatus comprising a pair of direction finding antennae A and B which are arranged to pickup a signal the bearing of which it is desired to establish. Each antenna feeds a respective receiver channel C, D which converts the received signal to an intermediate frequency signal of 100 kc./s., such that the amplitudes of the intermediate frequency components of the received signals in the two receiver channels are respectively proportional to sin Q and cos Q where Q is the bearing angle of the received signal with reference to the direction finding antennae.

Referring to FIGURE 1, the sin Q and cos Q intermediate frequency signals are fed respectively to the input terminals 1 and 2 leading to the inputs of gain controlled operational amplifiers 3 and 4. The outputs of amplifiers 3 and 4 are fed to respective detectors 5 and 6 the outputs of which are compared in a comparator circuit 7.

Each of the amplifiers 3 and 4 is provided with a feedback network comprising respective output-to-input feedback elements 8 and 10 operating in conjunction with series input resistors 9 and 11. The overall gain of the ampifiers 3, 4 can be controlled by varying the conductance of the respective elements 8 or 10 in its feedback network. Initially, the gains of amplifiers 3 and 4 are set to a predetermined minimum value by a corresponding setting of conductances 8 and 10. In the absence of a received signal the two receiver channels are equalised in gain. When a received direction finding signal is introduced to the system, by connecting the direction finding antennae to the receivers, the signal amplitudes in the two channels are therefore proportional to the sine and cosine of the direction finding bearing angle. In a manner to be described, the comparator determines which channel contains the smaller of the two signals and causes the gain of the amplifier in that channel to be increased by modifying the conductance of the corresponding feedback element until the detected outputs are equal. If the sin Q signal is the smaller and the overall voltage gain of the operational amplifier 3 is proportional to $1/G$ where G is the feedback conductance, which will be true provided that the intrinsic gain of the amplifier is high in comparison with the overall gain, then cos $$Q = \frac{1}{G} \sin Q$$

whence $G = \tan Q$. This is true for values of Q greater than zero and less than 45° when sin Q is less than cos Q. When the cos Q signal is greater than the sin Q signal on the other hand, the gain of the amplifier 4 is controlled. In this case therefore $$\frac{1}{G} \cos Q = \sin Q$$

or $G + \cos Q$.

Thus it will be seen from the foregoing that the conductance of the respective feedback element 8 or 10 which is adjusted to achieve balance at the detectors is a measure of the tangent or co-tangent of the direction finding bearing angle in one quadrant. It will also be apparent that the dynamic range required of the detectors 5 and 6 is no more than that produced by a signal change from cos 0° to cos 45°, that is a change of 3 decibels.

A method whereby the angle may be extracted from a measurement of its tangent or co-tangent will now be described.

A generator 12 is provided which generates a parameter $\phi$. An output signal corresponding to the value of $\phi$ is fed to a function generator 13 which generates an output function tan $\phi$. The function tan $\phi$ is used to control the conductance of the respective feedback element 8 or 10 in the feedback path of the operational amplifier in the channel containing the smaller of the two bearing signals.

When the bearing signal is initially connected to the direction finding channel, the generator 12 is caused to supply an output $\phi=0$, and the output of the comparator 7 is employed to switch the output of the function generator 13 to control the conductance of the feedback element 8 or 10 in the channel containing the smaller received bearing signal. The generator 12 thereafter produces a uniformly increasing value of the parameter $\phi$, and the function generator 13 controls the conductance of the corresponding feedback element 8 or 10 to which it has been connected by means of the comparator 7, in accordance with the function tan $\phi$. As soon as the outputs from the detectors 5 and 6 become equal, the comparator 7 inhibits a further increase in the parameter $\phi$, and the value reached is then read out to give the required bearing. The value of $\phi$ read out will directly represent the required bearing angle in those cases where cos Q is greater than sin Q. The value of $\phi$ read out will represent 90° minus the required bearing angle in those cases where sin Q is greater than cos Q. The sense of the initial output from the comparator 7 indicates whether sin Q or cos Q is the greater and is thus used to enable the correct bearing angle to be selected from these two alternatives.

The parameter $\phi$ can be an analogue voltage and may take the form of a linear ramp which is arrested and held when detector output balance is achieved.

Instead, and in order to improve accuracy, $\phi$ can be expressed digitally, and in a preferred embodiment of the invention $\phi$ is generated in the form of binary signals on a number of parallel lines. In this embodiment the function generator 13 is a diode matrix and the variable feedback elements 8, 10 can be made up of a number of resistors controlled by a combination of binary switches. An accuracy of 1% may be attained by this means. It is convenient to allow $\phi$ to be formed by the parallel output of a binary counter which is itself supplied with a uniform input pulse train. Moreover, if each pulse counted represents a 1° increment in bearing and the pulse train is inhibited when detector balance is achieved, the state of the counter will then represent the required bearing angle in binary form.

FIGURE 2 shows a block diagram of this embodiment. The generator 12 of FIGURE 1 is in the form of a pulse generator 20, which generates a train of pulses and feeds them via a gate 21, controlled by the output of the comparator 7, to the input of a "units" counter 22 which is also linked to a "tens" counter 23. The counters 22 and 23 are in the form of a two-stage binary-coded decimal counter since this produces a final output in a form which matches the requirements of subsequent equipment stages. It will be understood, however, that a six-bit pure binary counter or any other convenient form of digital counter could be employed instead.

The outputs from the stages of counters 22 and 23 are fed respectively to decoders 24 and 25, which respectively provide the units and tens indication inputs to a final decoder 26. The output from the decoder 26 is fed to the tangent generator 13 which comprises a diode matrix 33. The matrix 33 produces an output on a channel comprising seven lines in parallel which output represents the binary value of the tangent of the input parameter $\phi$. The channel is connected via respective gates 35 and 38 to the corresponding switching input of switched resistor networks 28, 30 which are connected in the feedback paths of the operational amplifiers 3, 4 and which represent the adjustable elements 8 and 10 of FIGURE 1. The output of the comparator 7 is connected to the input of a bistable element 27 which assumes a state representative of the direction of unbalance of the signal outputs from the detectors 5 and 6 when the received signal is first applied to the direction finding channels. The bistable element 27 generates corresponding control signals on lines X and Y, which are employed to operate the gates 35 and 38. Direct outputs from the counters 22 and 23 are fed to respective gates 39 and 40, while complement outputs are fed to respective gates 36, 37. Gates 36 and 39 feed an output terminal 42 and gates 37 and 40 feed an output terminal 41. Terminals 41 and 42 are connected to decimal number display apparatus. The gates 36, 37, 39 and 40 are controlled from the output of the bistable element 27 by the lines X and Y.

The switched resistor network 28 connected in the feedback path of the operational amplifier 3 is illustrated in more detail in FIGURE 3, the network 30 being the same. It will be seen from FIGURE 3 that the output of the operational amplifier 3 is connected to the input via a plurality of parallel circuits comprising a series connection of a resistor 44 and a switch 45. The resistances of the resistors 44 are arranged in a binary series so that the resistance of each resistor 44 in the series is twice that of the preceding resistor. Each of the seven output lines from the gate 35 is connected to control one of the switches 45 shown in FIGURE 3. The switches 45 are so arranged that, when the gate 35 is off, the feedback network connects all the resistors 44 in circuit, making the gain of the operational amplifier equal to unity.

The operation of the apparatus of FIGURE 2 will now be described.

The counters 22, 23 are initially reset to a reading of 45°. Assuming that the signal applied to terminal 1 is smaller than the signal applied to terminal 2, the comparator 7 causes the bistable element 27 to generate a signal which is conveyed along the line X to the gate 33 which is thus switched ON, enabling the outputs from the tangent function matrix 33 to be applied to switch the resistors 44 in the network 28 in the feedback circuit of amplifier 3. The signal on line X also switches ON gates 36 and 37. The voltage existing on the line Y in this case is such as to switch the gate 38 OFF and to prevent the output from matrix 33 from affecting the switches in the network 30 which thus maintains the gain of the amplifier 4 at a value of unity: the voltage on line Y also switches OFF the gates 39 and 40.

The output from the comparator 7 is also fed to the gate 21 which is thus switched ON to allow pulses from the pulse generator 20 to be fed to the input of the "units" counter 22. These pulses are narrow with respect to their repetition period so that they effectively strobe the output from the comparator circuit 7, thus reducing adverse effects resulting from transients generated in the receiving circuits such as, for example, when the amplifier gains are changed. The counters 22 and 23 count the input pulses, starting from the pre-set value of 45, each count representing an increment of 1° in angle. As each pulse is counted, the output of the matrix 33 is correspondingly altered in response to the inputs from the decoders 24, 25 and 26, and corresponding re-adjustments are made in the switched resistor network 28 controlled via the gate 35. The gain of the operational amplifier 3 is thus correspondingly increased as the counters 22 and 23 respond to each input pulse from the generator 20. This process continues until the signal from the detector 5 has risen to the same value as that from the detector 6, at which point the comparator 7 detects the balanced condition and switches OFF the gate 21, preventing any further pulses from the generator 20 from reaching the counter 22.

The required bearing can now be read out from the outputs of the gates 36 and 37.

In the example being described, the sine signal is less than the cosine signal indicating that the bearing angle should lie between 0° and 45° in that quadrant. Since the counters 22 and 23 were initially set to 45°, and counted upwards towards 90°, the required bearing is that given by the complement of the angle registered in the counters when the balanced condition is reached and this is the output produced by the gates 36 and 37.

In cases where the cosine signal applied to terminal 2 is less than the sine signal applied to terminal 1, the initial unbalance registered by the bistable element 27 is such as to switch ON gates 38, 39 and 40, while maintaining the gates 35, 36 and 37 OFF. The operation of the arragement is then analogous to that described above, but the required bearing at the final balanced condition must lie between 45° and 90° and is therefore given by the actual angle registered in the counters 22 and 23 as indicated by the outputs of gates 39 and 40.

The gates 36 and 37 may comprise sets of de-coding gates generating the "tens" complement of units counter 22 and the "eights" complement of the tens counter 23.

The binary coded decimal output derived from the terminals 41 and 42 can be used directly for transmission purposes or may be further decoded in order to drive a decimal display. In the embodiment of FIGURE 2 quadrant information derived from the direction finding system is displayed separately.

In a modification shown in FIGURE 4, it is possible to express the direction finding bearing within the full range of 0° to 360°. FIGURE 4 shows the pulse generator 20, the gate 21, the counters 22 and 23, and the decoders 24 and 25, of FIGURE 2, the other components thereof being omitted from FIGURE 4 for clarity, but in addition shows a bi-directional three stage binary coded decimal counter 49 made up of a "units" counters 50, a "tens" counter 51, and a "hundreds" counter 52, to all of which the output pulses from the gate 21 are also fed and counted. The direction finding receiving channels C, D (FIGURE 1) are provided with means 54 for extracting quadrant information from the received signal. Such means may include known apparatus for obtaining an omnidirectional signal, comparing the phase of this signal with the phases of signals in the two direction finding receiver channels C and D, and deriving therefrom information as to the quadrant in which the signal is being received. The quadrant information is fed to the input of a quadrant decoder 55. An output channel 55 from the quadrant decoder 55 is connected to appropriate stages in the counters 50, 51 and 52, so that, prior to the determination of a bearing, the output counter 49 is caused to register a count of 45°, 135°, 225°, or 315° depending on the quadrant information presented to the quadrant decoder 55. The output counter 49 is arranged to count up or down, according as to whether line X or Y is energised, in response to the pulses from gate 21. As before, the lines X and Y are energised from the output of the bistable element 27 (FIGURE 2). A balance condition is reached in similar manner to that described with reference to FIGURE 2, but, because the counter 49 is initially set, by decoder 55, to the initial value of the correct quadrant, and because it then counts in the appropriate direction, the required bearing is given directly by the binary coded decimal output on parallel output lines 57 from the counter 49. As before, the output on lines 57 can be used for transmission, or can be supplied to a decimal decoder to drive a decimal display, or otherwise distributed to remote locations.

It will be appreciated that many modifications can be made to the system without departing from the scope of the invention. For example, the gain of the amplifiers 3 and 4 may be varied by alternating the series as well as the shunt conductances.

What is claimed is:

1. Apparatus for measuring the bearing angle of a received electromagnetic signal, comprising
   receiving means for receiving the electromagnetic signal,
   means responsive to the received electromagnetic signal and operative to produce first and second electrical signals respectively proportional to the sine and cosine of the bearing angle,
   comprising means connected to receive the two electrical signals and to measure the ratio between them, and
   modifying means controlled by the comparing means and operative to modify the value of at least one of the electrical signals by such factor as makes the ratio unity, whereby the said factor is characteristic of the tangent of the required bearing angle.

2. Apparatus according to claim 1, in which the receiving means comprises a pair of direction-finding antennae.

3. Apparatus according to claim 1, including
   first amplifying means connected to amplify the first electrical signal,
   second amplifying means connected to amplify the second electrical signal, and
   means connecting the comparing means to compare the values of the amplified first and second electrical signals,
   the modifying means comprising means connected to the amplifying means to adjust the relative gains of the amplifying means until the ratio between the amplified signals is unity.

4. Apparatus according to claim 3, in which the modifying means comprises
   means operative to generate a substantially linearly increasing control signal,
   means responsive to the linearly increasing signal to produce a tangent signal substantially proportional to the tangent of the increasing control signal over at least predetermined range, and
   means responsive to the tangent signal to adjust the relative gains of the two amplifying means in dependence thereon.

5. Apparatus according to claim 4, in which the comparing means comprises means connected to the means operative to generate the control signal and operative to arrest the increase of the control signal when the said ratio is unity whereby the value of the arrested signal is characteristic of the required bearing angle.

6. Apparatus according to claim 4, including detecting means responsive to the un-amplified electrical signals and operative to detect the lower-valued one thereof, and in which the means operative to adjust the relative gains of the amplifying means comprises variable resistance means connected to each amplifying means for varying its gain and means selectively connectable to the two variable resistance means under control of the detecting means and operative to increase the gain of that amplifying means which is amplifying the lower-valued one of the two electrical signals.

7. Apparatus responsive to first and second electrical signals respectively proportional to the sine and cosine of the same angle and operative to produce an output proportional to the said angle, comprising
   first generating means operative to produce a substantially linearly increasing control signal,
   second generating means connected to receive the control signal and operative to produce a tangent signal which is substantially proportional to the tangent of the value of the control signal over at least a predetermined range,
   detecting means responsive to the first and second electrical signals and operative to detect which of them is the lower,
   modifying means responsive to the tangent signal and connected to be controlled by the detecting means and operative to modify the relative values of the electrical signals by a factor which is proportional to the tangent signal and tends to equalise the two electrical signals, and
   comparing means connected to receive and compare the modified electrical signals and arranged to arrest the increase of the said control signal when the ratio between the modified electrical signals is unity, whereby the value of the arrested control signal is characteristic of the said angle.

8. Apparatus according to claim 7, in which the means operative to generate the control signal comprises
   pulse generating means, and
   counting means connected to count the pulses and to produce as the control signal a count signal proportional to the count of the counting means.

9. Apparatus according to claim 7, in which the means operative to generate the control signal comprises
   pulse generating means, and
   counting means connected to count the pulses and to produce a count signal proportional to the count of the counting means, which count signal constitutes the control signal, and a complement signal proportional to the complement of the count of the counting means; the apparatus also including
   output means,
   first gating means controlled by the detecting means and operative to feed the said count signal to the output means when the said second signal is greater than the first signal, and
   second gating means controlled by the detecting means and arranged to feed the said complement signal to the output means when the first electrical signal is greater than the second electrical signal.

10. Apparatus according to claim 7, in which the first generating means comprises
    pulse generating means, and
    counting means operative to count the pulses and to produce as the control signal a count signal proportional to the count of the counting means; the apparatus also including
    an output counter connected to the pulse generating means to count the said pulses in step with the said counting means,
    means connecting the detecting means to the output counter to determine the direction of counting of the output counter in dependence on the relative values of the un-amplified electrical signals whereby the output counter counts up when the second electrical signal is greater than the first electrical signal and counts down when the first electrical signal is greater than the second electrical signal,
    means operative to generate a quadrant signal representative of the quadrant in which lies the required bearing angle, and
    re-setting means responsive to the quadrant signal and operative to re-set the output counter to a particular initial count in dependence thereon, whereby the count of the output counter is equal to the required angle when the counting means is arrested by the comparing means.

References Cited

UNITED STATES PATENTS 2,026,254  12/1935  Sandfort _____ 343—119

RODNEY D. BENNETT, JR., Primary Examiner

RICHARD E. BERGER, Assistant Examiner

U.S. Cl. X.R.

235—150.26, 186